US005917601A

United States Patent [19]
Shimazaki et al.

[11] Patent Number: 5,917,601
[45] Date of Patent: Jun. 29, 1999

[54] POSITION DIFFERENCE DETECTING DEVICE AND METHOD THEREOF

[75] Inventors: Kazunori Shimazaki; Kiyoshi Yoshida, both of Aichi, Japan

[73] Assignee: Kabushiki Kaisha Toyoda Jidoshokki Seisakusho, Kariya, Japan

[21] Appl. No.: 08/982,093

[22] Filed: Dec. 1, 1997

[30] Foreign Application Priority Data

Dec. 2, 1996 [JP] Japan .................................. 8-321220

[51] Int. Cl.$^6$ ............................ G01B 11/14; G01B 11/00
[52] U.S. Cl. ......................................... 356/375; 356/400
[58] Field of Search ........................... 356/375, 399–400; 318/568.16

[56] References Cited

U.S. PATENT DOCUMENTS 5,483,138  1/1996  Shmookler et al. ............... 318/568.16

FOREIGN PATENT DOCUMENTS 4-295704  10/1992  Japan .
A-6-224284  8/1994  Japan .

OTHER PUBLICATIONS

U.S. Patent Application Serial No. 07/985,197, filed on Nov. 12, 1992, Shmooker et al.

Primary Examiner—Robert H. Kim
Assistant Examiner—Amanda Merlino
Attorney, Agent, or Firm—Morgan & Finnegan, L.L.P.

[57] ABSTRACT

An R-θ robot moves a wafer between chambers according to an instruction issued by a robot controller. An optical sensor detects two edge positions of the wafer which stands still in a hand of the R-θ robot when the R-θ robot is in a predetermined stationary state. The robot controller obtains the length and the middle position of a chord of the wafer based on the two edge positions. This data is compared with the data of the length and the middle position of the chord which should be obtained when the wafer is placed in a reference position in the hand of the R-θ robot, so that a position difference of the wafer to be moved from the reference position is detected. The robot controller controls the operations of the R-θ robot in order to correct the detected position difference.

9 Claims, 9 Drawing Sheets

INITIAL REFERENCE STATE
(1) Lo IS OBTAINED BY SENSOR
(2) CALCULATING "Yo"  ($Yo = \sqrt{(r^2 - (1/2 \cdot Lo)^2)}$)

AFTER DIFFERENCE OCCURRED
(3) MEASURING "Lm"
(4) CALCULATING "Ym"  ($Ym = \sqrt{(r^2 - (1/2 \cdot Lm)^2)}$)
(5) CALCULATING "Dy"  ($Dy = Yo - Ym$)

INITIAL REFERENCE STATE (1) Lo IS OBTAINED BY SENSOR (2) CALCULATING "Yo" ( Yo = $\sqrt{(r^2 - (1/2 \cdot Lo)^2)}$ )

AFTER DIFFERENCE OCCURRED (3) MEASURING "Lm"

(4) CALCULATING "Ym" (Ym = $\sqrt{(r^2 - (1/2 \cdot Lm)^2)}$ )

(5) CALCULATING "Dy" (Dy = Yo − Ym)

POSITION DIFFERENCE DETECTING DEVICE AND METHOD THEREOF

BACKGROUND OF THE INVENTION

1. Field of the Invention

The present invention relates to a system for detecting and correcting a position difference of a discoid object and a method thereof, and more particularly to a system for detecting and correcting a position difference of a discoid semiconductor wafer from a predetermined position and a method thereof. Furthermore, the present invention relates to a technique for moving a wafer to a position which is accurately determined, and placing the wafer in that position also when a position difference of a wafer on a conveying robot occurs.

2. Description of the Related Art

When a semiconductor integrated circuit is manufactured, various processes are performed in the state of a wafer. Each of the processes for the wafer is normally performed in a chamber for each of the processes. A robot moves the wafer between chambers. That is, when a process is completed in one chamber, a wafer-moving robot takes a wafer out of the chamber, and moves it to another chamber. At this time, the wafer must be accurately placed at a predetermined position in the chamber.

For example, an R-θ robot is well known as a wafer-moving robot. Such a robot has an arm for holding a wafer and can accurately control a length and an angle of the arm. Accordingly, if a wafer is placed at a predetermined position on a hand at the end of an arm of the wafer-moving robot, the wafer is accurately moved to a predetermined position in a target chamber. In other words, if the wafer is placed at a position different from the predetermined position on the hand of the wafer-moving robot, the wafer is not moved to the predetermined position in the target chamber. Therefore, techniques for detecting the position of a wafer on a hand of a wafer-moving robot (or a position difference), and correcting the position difference if it exists have been developed.

As one technique for detecting the position of a wafer, the prior art (U.S. Ser. No. 07/975,197 whose application was filed on Nov. 12, 1992) is known. The technique disclosed in that application is as follows.

A plurality of pairs respectively composed of a light emitter and a light receiver are arranged along a line across an arced path on which a wafer is moved between chambers. If the wafer blocks the light output from each light emitter when the robot hand carrying the wafer is rotated in a direction θ, a plurality of coordinate points at the leading and trailing edges of that wafer can be determined from the outputs of the light receivers. Two arbitrary coordinate points are selected among the plurality of coordinate points, and a vertical bisector of the segment connecting these two points is drawn. Similarly, another vertical bisector of a segment connecting another two coordinate points is drawn. The intersecting point of these vertical bisectors is defined to be the central position of the wafer.

Japanese laid-open patent publication (TOKKAIHEI) No. 4-295704 is known as another technique for detecting the position of a wafer. With this technique, a linear image sensor which is longer than the diameter of a wafer is arranged, and the wafer is made to pass under the linear image sensor. When the wafer passes through the linear image sensor, the length of a chord is sequentially detected using the linear sensor. Since the longest chord among detected data is the diameter of the wafer, the middle point of the longest chord is detected and that point is defined to be the central position of the wafer.

Some other techniques for detecting the central position of a wafer have been proposed in addition to the above described conventional techniques. Most of them obtain a difference between the central point of a rotation and that of a wafer by rotating the wafer and successively measuring the locus of wafer edges.

The above described implementations according to the conventional techniques respectively have the following problems. One disadvantage of the implementation according to Ser. No. 07/975,197 is that coordinate data cannot be obtained unless a wafer is moved relatively to a sensor.

Generally, the response time of an optical sensor (the response speed of a photoelectric element) is several-hundred microseconds to several milliseconds. Assuming that the response time is 1 millisecond, and the moving speed of the wafer is 500 millimeters per second, the measurement error of 0.5 millimeters arises. To reduce this error, the moving speed of the wafer must be reduced, which leads to the deterioration of the throughput speed of a device.

Additionally, the response time of the optical sensor when the sensor is switched from ON to OFF (when a light receiving element changes from the state in which it receives light to the state in which it does not receive light) is different from the response time when the sensor is switched from OFF to ON (when the light receiving element changes from the state in which it does not receive light to the state in which it receives light). Therefore, the difference between the response times is difficult to be corrected if data detected at the leading and trailing edges are mixed.

Furthermore, since the diameter of a spot of a photoelectric sensor for detecting the blocking and passing of light is normally in the order of 1 millimeter, it is difficult to strictly define that the sensor determines the blocking of light at what percentage of the spot is blocked.

As described above, the implementation according to Ser. No. 07/975,197 is suitable for measuring a relative amount of a move, but it is unsuitable for measuring a position. Additionally, in the implementation according to Japanese laid-open patent publication (TOKKAIHEI) No. 4-295704, a wafer must be moved toward a sensor in a similar manner as in the implementation according to Ser. No. 07/975,197. Accordingly, the move speed of the wafer must be slowed down in order to detect the moment that the length of a chord is the longest with high accuracy. As a result, the throughput speed deteriorates.

For the implementation in which a wafer is rotated, its disadvantage is also pointed out as in the application of Ser. No. 07/975,197, the scale of the detection device is large, and a considerable amount of time is required to rotate and measure the wafer, so that the throughput of the entire device deteriorates.

SUMMARY OF THE INVENTION

An object of the present invention is to provide a device for efficiently and accurately detecting the position of a wafer and a method thereof. Another object of the present invention is to provide a device for correcting a position difference of a wafer and accurately moving and placing the wafer to a target position if the position difference exists.

According to the present invention, a device for detecting a position difference of a circular object such as a semiconductor wafer comprises the following units. Note that the following units are explained based on the assumption that the measurement target is a wafer.

A detecting unit, which is arranged at a predetermined position, obtains the length and the central position of a chord of a wafer which stands still at the predetermined position, by performing an optical measurement. A storing unit stores output data from the detecting unit when the wafer stays at a predetermined reference position. A calculating unit calculates how different the position of the wafer is from the predetermined reference position based on the output data of the detecting unit and the data stored in the storing unit when the wafer stays at the desired measurement position.

Since a semiconductor wafer is normally manufactured based on a standard, its diameter is known in most cases. Additionally, it can be easily realized to measure the radius of each wafer beforehand according to a conventional technique, and store its value. Accordingly, if the length and the central position of a chord of the wafer can be obtained, the central position of the wafer is obtained by using the relationship between the lengths of three sides of a right-angled triangle. The center of the wafer when staying at the reference position and that of the wafer when staying at a measurement position are respectively obtained and compared by using this method, so that the position of the wafer, which is relative to the reference position, that is, the position difference, is detected.

The detecting unit, which includes an optical system for generating a beam of light perpendicular or almost perpendicular to the surface of a wafer and a light receiving unit for receiving the beam of light, detects two edge positions of the wafer based on the output of the light receiving unit, and obtains the length and the middle position of a chord of the wafer by recognizing the segment connecting the two edge positions as the chord of the wafer. The light receiving unit is, for example, a measurement line sensor for obtaining an analog output proportional to an amount of received light.

DETAILED DESCRIPTION OF THE INVENTION

Figure 1:
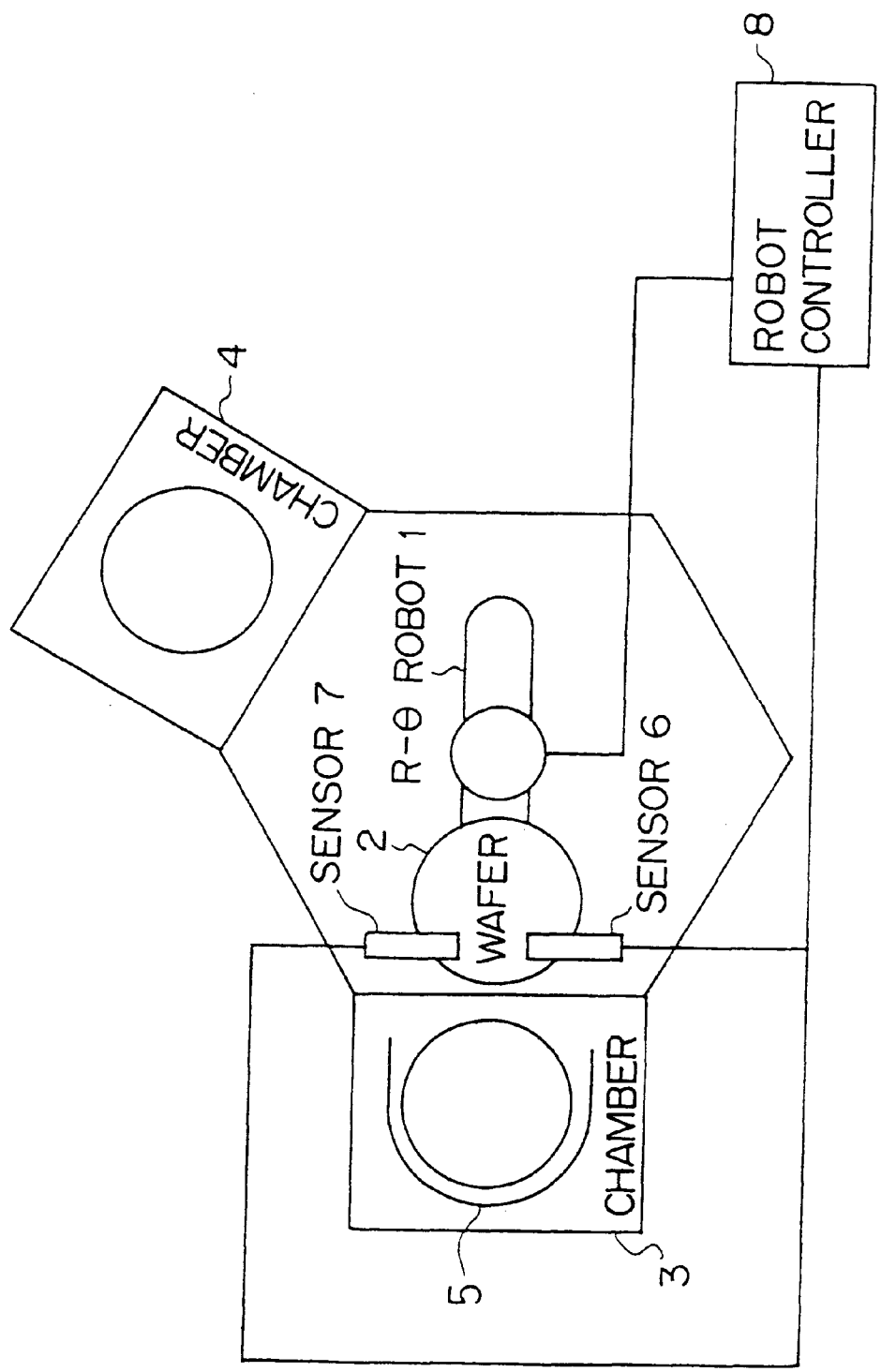
FIG. 1 is a schematic diagram showing the configuration of a semiconductor manufacturing system to which a wafer-moving device according to an embodiment of the present invention is applied.

Provided hereinafter is the explanation about an embodiment according to the present invention, by referring to the drawings. Adopted and explained below is a system for moving a semiconductor wafer between chambers as the embodiment of a system to which a position difference detecting device (and a method thereof) according to the present invention is applied. This wafer-moving device is sometimes called a cluster tool.

FIG. 1 is a schematic diagram showing the configuration of a semiconductor integrated circuit manufacturing system to which the wafer-moving device according to the present invention is applied. With the system shown in this figure, a wafer-moving robot moves a wafer to a predetermined process chamber, and performs a predetermined process for the wafer in the chamber in a similar manner as with a typical semiconductor integrated circuit manufacturing system.

An R-θ robot 1 is a wafer-moving robot, and moves a wafer 2 according to an instruction issued by a robot controller 8. Assume that the procedure for sequentially processing wafers held in a wafer cassette 5 within a chamber 3 in a chamber 4, and returning the wafers to the wafer cassette 5 within the chamber 3, is programmed. In this case, the R-θ robot 1 extracts the wafers 2 included in the chamber 3, and moves them to the chamber 4.

A wafer 2 is a discoid semiconductor. Its diameter is assumed to be known here. That is, with the system according to the present invention, many wafers are sequentially processed, and the differences between the diameters of the wafers are slight enough to be regarded as being substantially identical.

The chamber 3 comprises the wafer cassette 5 which can include a plurality of wafers, and is a base from which the wafer 2 is moved. The wafer cassette 5 comprises a plurality of wafer holding slots, and holds a plurality of wafers 2 in the direction perpendicular to the drawing of FIG. 1. The chamber 4 is a process chamber for performing a predetermined process for each wafer 2. As the basic operations of the system, the R-θ robot 1 first takes out one wafer held in the wafer cassette 5 within the chamber 3, moves the wafer 2 to the chamber 4, and performs a predetermined process there. When the process in the chamber 4 is completed, the R-θ robot 1 takes the wafer 2 out of the chamber 4, and replaces it back in the wafer cassette 5 within the chamber 3.

Within the chamber 3, each wafer is held in each holding slot of the wafer cassette 5. Within the chamber 3, each wafer is not required to be located at an accurate position. Accordingly, each wafer generally has a position difference with one another (relatively). If a wafer 2 is moved from the chamber 3 to the chamber 4 without considering the position difference, the wafer 2 is not placed in a target position in the chamber 4. The chamber 4 performs a process for the wafer 2 based on the assumption that the wafer 2 is located at the predetermined target position within the chamber 4. Therefore, if the wafer 2 is not accurately located at the predetermined position within the chamber 4, an unsuitable process may be performed for the wafer 2.

The position of the wafer 2 may get out of position during the process in the chamber 4, or during the handling operation after the process. If the position difference is ignored and the wafer 2 is moved from the chamber 4 to the wafer cassette 5 within the chamber 3, the wafer 2 may sometimes not be inserted into a predetermined holding slot of the wafer cassette 5 in a smooth manner.

The system according to the present invention has the capabilities and configuration for detecting and correcting a position difference of a wafer, and moving the wafer to a predetermined target position within each chamber.

Optical sensors 6 and 7 are line sensors, and fixedly arranged for the chambers 3 and 4 (so that they do not move relatively to the chambers 3 and 4), and respectively detect the edge positions of the wafer 2 by performing an optical measurement. The optical sensors 6 and 7 detect the edge positions of the wafer 2 which is held by the hand of the R-θ robot 1 and remains stationary when the R-θ robot 1 is in a predetermined state (for example, the state in which "R" is the shortest (the length of an arm in the direction "R" is the shortest), and θ is in the direction of the chamber 3 (the hand is in the direction of the chamber 3). The outputs of the optical sensors 6 and 7 are transferred to the robot controller 8.

The robot controller 8 controls the R-θ robot 1 according to a program which is described beforehand, and makes the R-θ robot 1 move the wafer 2. At this time, the robot controller 8 detects the position of the wafer 2, which is relative to the reference position (that is, the position difference from the reference position), based on the outputs of the optical sensors 6 and 7. Here, the reference position is a predetermined optimum position. The robot controller 8 controls the R-θ robot 1 so that the wafer 2 is moved to a predetermined position in a target chamber by correcting the detected difference.

Figure 2:
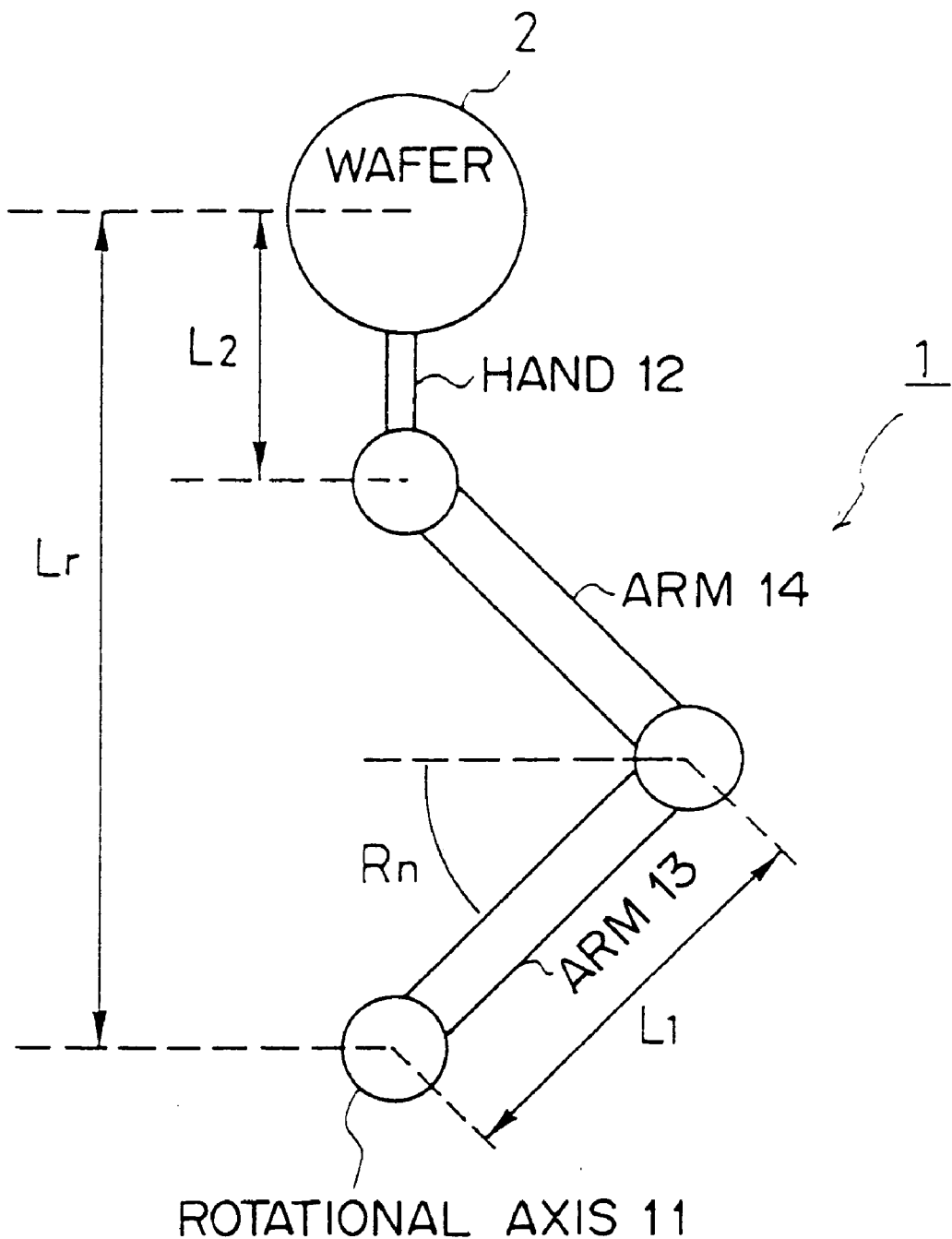
FIG. 2 is a schematic diagram showing the structure of an R-θ robot.

FIG. 2 is a schematic diagram showing the structure of the R-θ robot 1. The operations of the R-θ robot 1 are controlled according to a robot coordinate system (R-θ coordinate system). The direction "R" is a direction in which the hand 12 exists when being viewed from a rotational axis 11. A robot hand according to this embodiment is a portion for holding the wafer 2, and the portion named a "hand 12" is part of a robot arm. Because the structure of the R-θ robot 1 itself is not important here, the portion to be connected to the end of an arm 14 is called the "hand 12" for ease of explanation. To change the position of the wafer 2 to the direction "R", an angle "Rn" between the arms 13 and 14 is adjusted.

The direction "θ" is a rotational direction about the rotational axis 11, and orthogonal to the direction "R". To change the position of the wafer 2 to the direction θ, the hand 12 and the arms 13 and 14 are altogether rotated about the rotational axis 11.

Figure 3A:
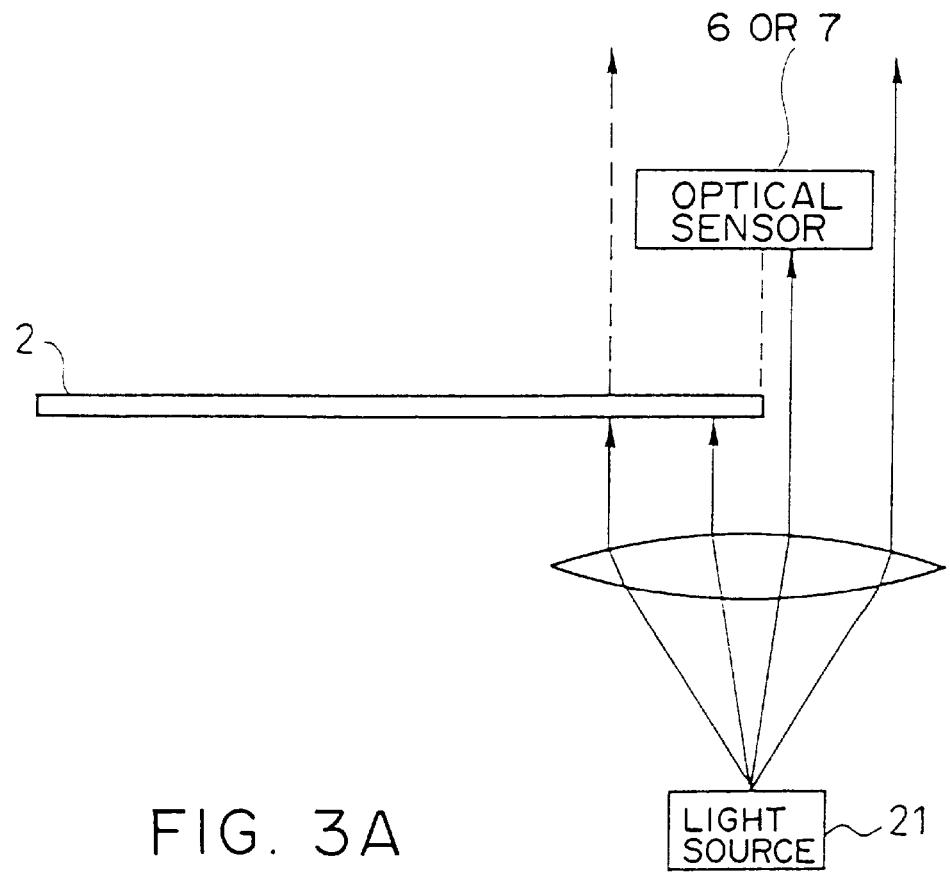
FIGS. 3A and 3B are schematic diagrams explaining optical systems included in an optical sensor.
Figure 3B:
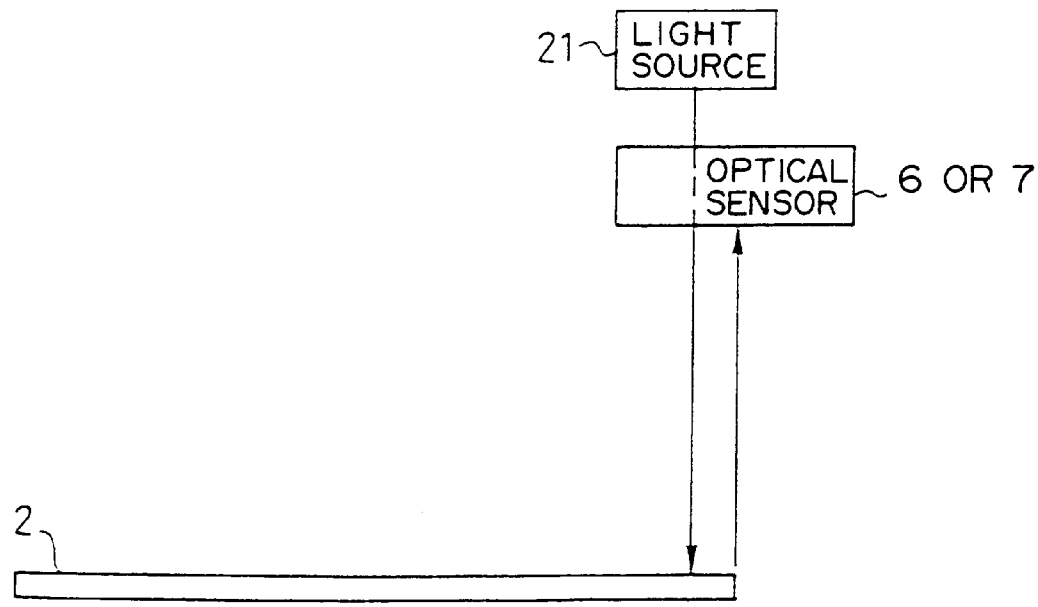

FIGS. 3A and 3B are schematic diagrams explaining an optical system of including optical sensors 6 and 7. For the optical system according to this embodiment, a light source 21 as a light emitting unit and an optical sensor 6 or 7 as a light receiving unit are arranged by putting the wafer 2 between them. Light beams output from the light source 21 are collimated by a lens, etc. The collimated light is irradiated in the direction perpendicular (or almost perpendicular) to the wafer 2, and is received by the optical sensor 6 or 7. If part of the parallel ray is blocked by the wafer 2 at this time, the amount of light received by the optical sensor 6 or 7 decreases by the amount of the blocked shaded part. Accordingly, the output of the optical sensor 6 or 7 allows the edge position of the wafer 2 to be detected. The optical system according to this embodiment may be of a reflecting type shown in FIG. 3B.

Figure 4:
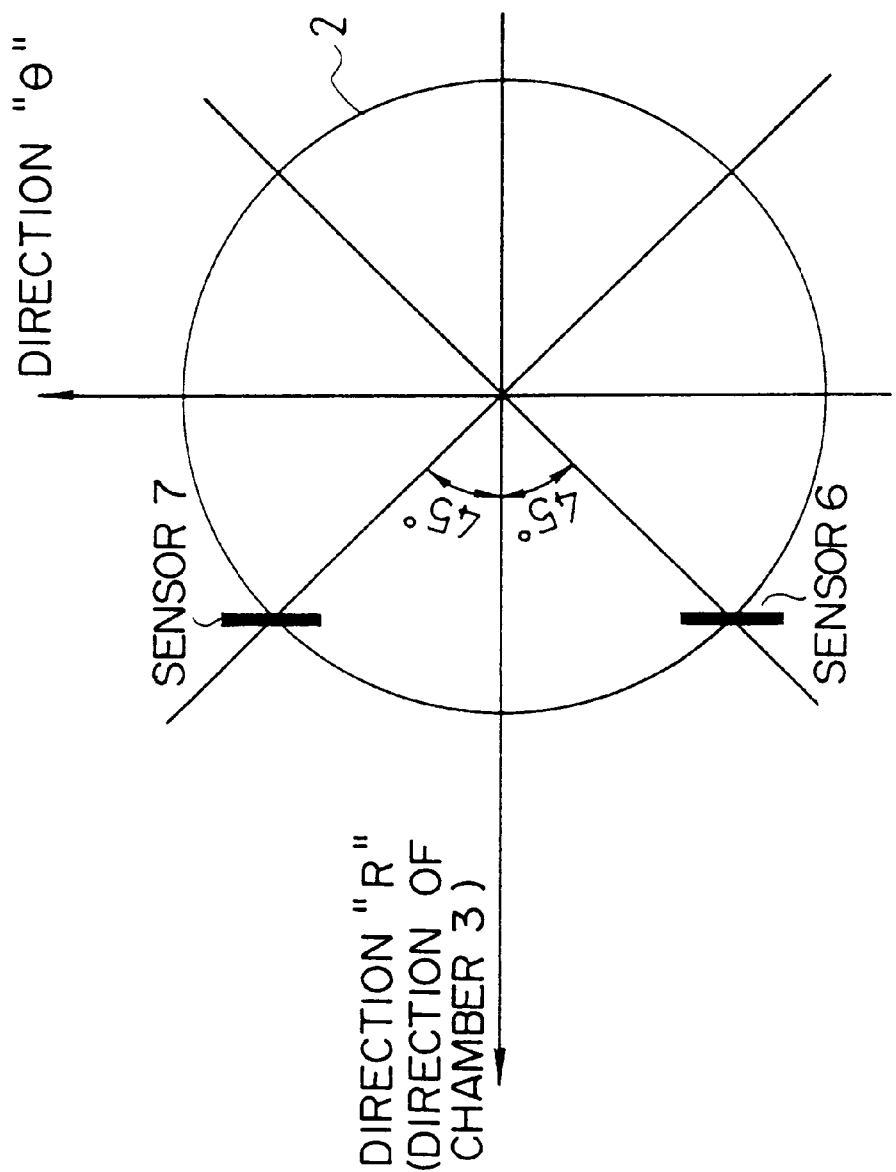
FIG. 4 is a schematic diagram explaining the position at which the optical sensor is arranged.

FIG. 4 is a schematic diagram explaining the positions at which the optical sensors 6 and 7 are arranged. The optical sensors 6 and 7 are fixedly arranged for the chambers 3 and 4 (so that they do not move relatively to the chambers 3 and 4) as described above. Their specific arrangement is as follows.

In FIG. 4, the wafer 2 indicates the position when the wafer 2 is held in a correct position in the hand 12 of the R-θ robot 1 on the condition that the hand 12 of the R-θ robot 1 is oriented in the direction of the chamber 3 ("θ" is the direction of the chamber 3), and the length of an arm in the direction "R" is the shortest ("R" is the shortest). The above described state of the Rθ robot 1 is hereinafter referred to as a "measurement state". The measurement state of the R-θ robot 1 which is defined here is one example. Another state may also be defined as the measurement state.

The optical sensors 6 and 7 are arranged on the lines which are open at ±45 degrees from the center of the wafer 2 in the direction "R" so that the centers of the sensors are at the edges of the wafer 2, when the R-θ robot 1 is in the measurement state and the wafer 2 is held in a correct position in the hand 12. Additionally, the optical sensors 6 and 7 are arranged in order to linearly measure the direction orthogonal to the direction "R". With this configuration, a position difference of the wafer 2 up to ±7 mm or so can be detected in both of the directions "R" and "θ", if the measurement range of each of the optical sensors 6 and 7 is assumed to be 15 mm.

Figure 5:
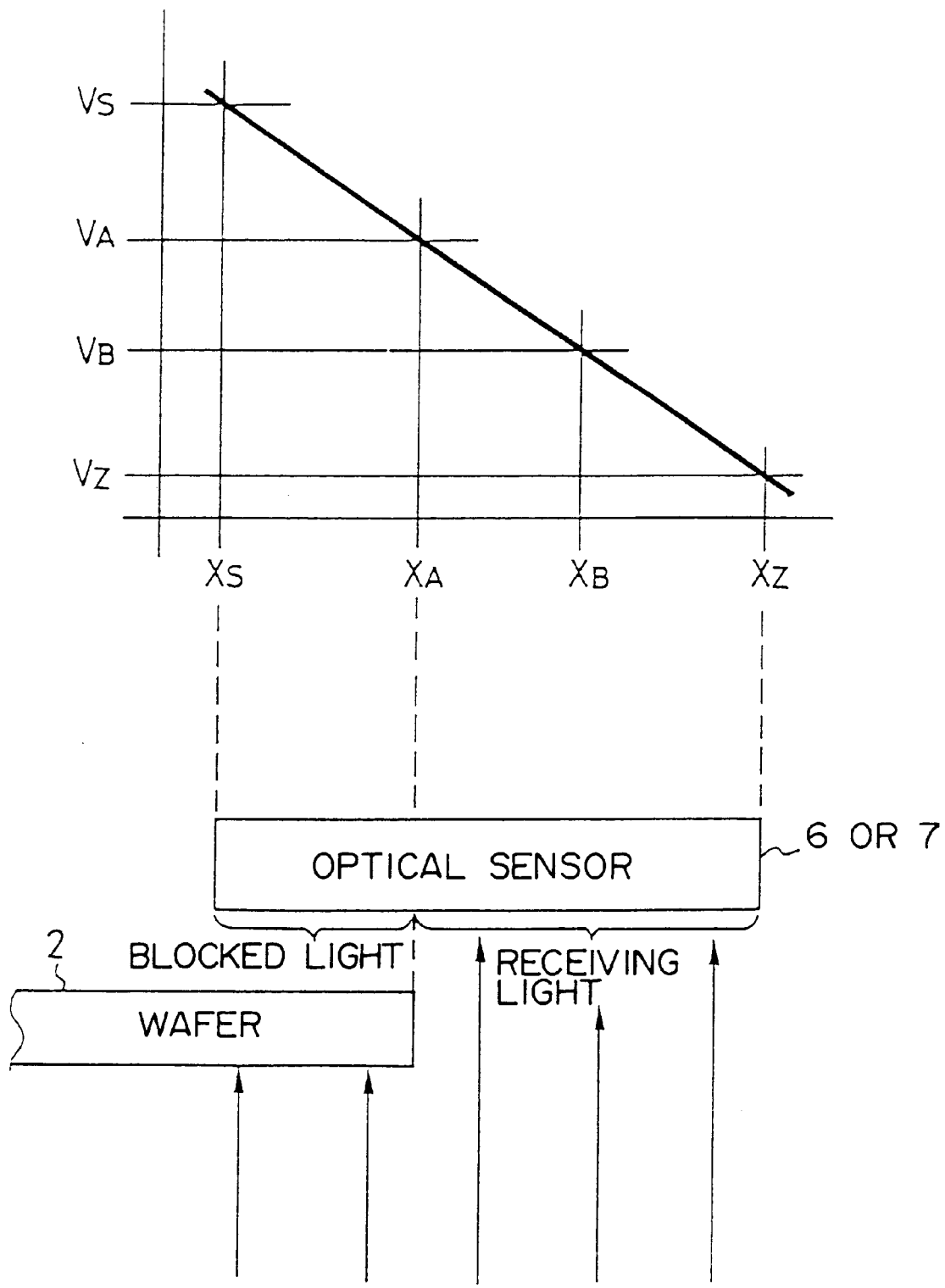
FIG. 5 is a schematic diagram showing the principle of position detection made by the optical sensor.

FIG. 5 is a schematic diagram showing the principle of the position detection performed by the optical sensor 6 or 7. The optical sensor 6 or 7 is a line sensor, and outputs a voltage proportional to an amount of received light. That is, it outputs a voltage proportional to the position of the boundary between a light receiving region and a light blocked region. Assuming that the wafer 2 stays at the position shown in FIG. 5 for the optical sensor 6 or 7, the optical sensor 6 or 7 outputs a voltage "$V_A$". As described above, the edge position of the wafer 2 can be detected by measuring the output voltage of the optical sensor 6 or 7.

Since the optical sensors 6 and 7 are arranged at the positions and in the directions as shown in FIG. 4, the edge position of the wafer 2 is detected in the direction orthogonal to the direction "R".

Figure 6:
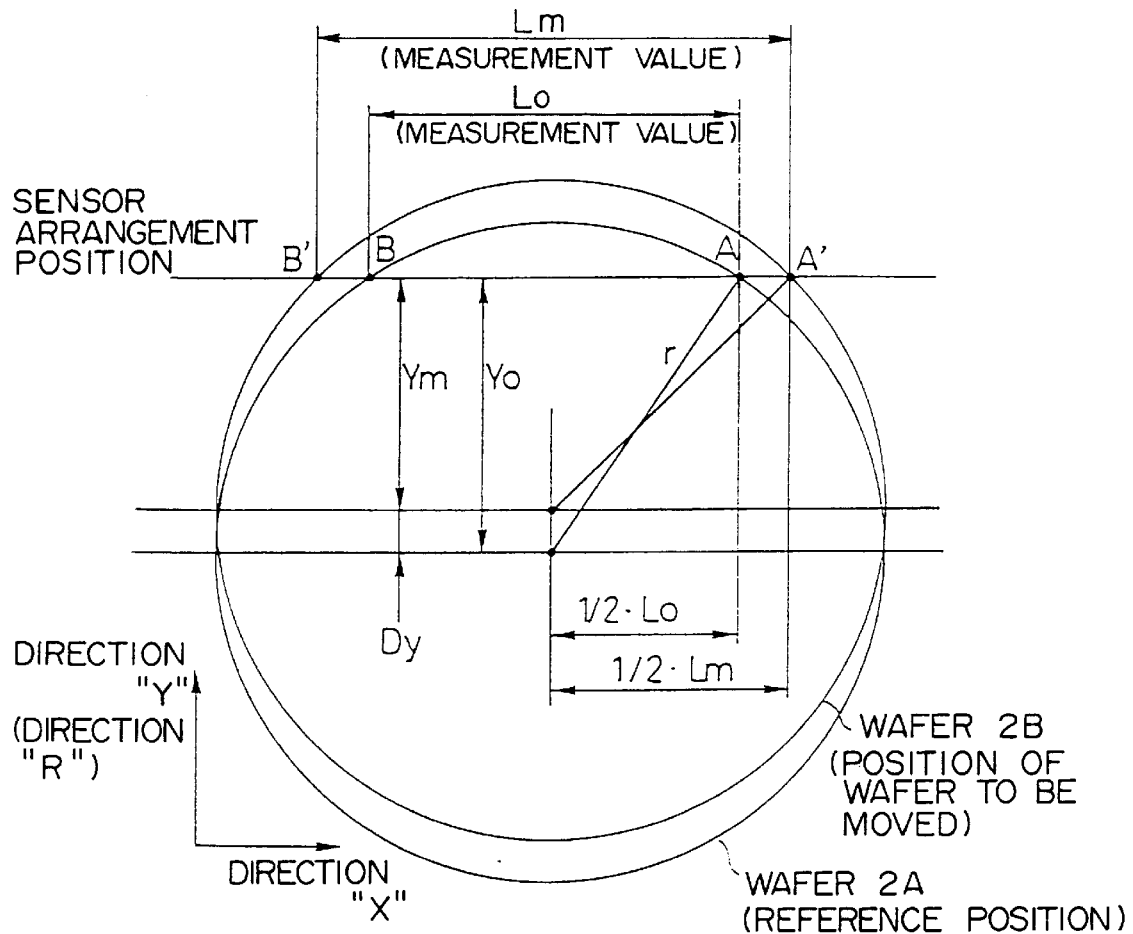
FIG. 6 is a schematic diagram explaining a method for detecting a position difference of a wafer.

Provided next is the explanation about the method for detecting a position difference of a wafer by referring to FIG. 6. The position difference of the wafer is obtained as a relative position difference in the hand 12 of the R-θ robot 1. Accordingly, position data is first obtained and stored beforehand from the outputs of the optical sensors 6 and 7 when the wafer 2 stays at the reference position in the hand 12. When a position difference of the wafer 2 to be actually moved in the R-θ robot 1 is detected, the position data of the wafer 2 to be moved is obtained from the outputs of the optical sensors 6 and 7. This position data is then compared with the position data at the reference position, which is obtained beforehand, so that the position difference is calculated.

First of all, the position of the wafer held at the reference position (hereinafter referred to as a wafer 2A) in the hand 12 is detected. Assume that the R-θ robot 1 is in the measurement state at this time. Two edge positions (points A and B) of the wafer 2A are detected from the outputs of the optical sensors 6 and 7. The segment connecting these two points is a chord of the wafer 2A. This chord is hereinafter referred to as a "chord AB". Additionally, the length of the chord AB is referred to as "L0".

The position of the wafer 2A can be defined according to the length "L0" of the chord AB and its middle point if the radius "r" of the wafer 2A is known. Namely, the position of the center of the wafer 2A in the direction "X" is the middle point "$H_o$" of the chord AB. When the position of the center of the wafer 2A in the direction "Y" is obtained, "$Y_o$" shown in FIG. 6 (the length of the vertical line from the center of the wafer 2A to the chord AB) is obtained. "$Y_o$" is represented by the following expression according to the relationship between the lengths of the three sides of a right-angled triangle.

$$YO=\sqrt{(r^2-(1/2 \cdot LO)^2)}$$

The dispersion of the radius "r" of a wafer (common to wafers 2, 2A, and 2B) is standardized, and the influence of the dispersion when "$Y_o$" is calculated is little enough to be ignored.

The above described calculation is executed by the robot controller 8. That is, the robot controller 8 detects the points A and B from the output voltages of the optical sensors 6 and 7 as the edge positions of the wafer 2A, and obtains the middle point "$H_o$". It also calculates "$Y_o$" using the preset radius "r" of the wafer 2. The robot controller 8 then stores the "$H_o$" and "$Y_o$" as the reference position data.

Then, the position of the wafer (hereinafter referred to as the "wafer 2B") to be actually moved between chambers, is detected. This method for detecting the position is the same as that for the wafer 2A. That is, the middle point "Hm" of the chord A'B' is obtained with a similar procedure, and "Ym" (the length of the vertical line from the center of the wafer 2B to the chord A'B') is obtained using the following expression.

$$Ym=\sqrt{(r^2-(1/2 \cdot Lm)^2)}$$

The position difference of the wafer 2B to be moved from the wafer 2A held at the reference position is represented by the following expressions.

X direction: DX=Hm−$H_o$

Y direction: DY=−Ym+Y
point of a chord of a wafer held at a reference position and the length and the middle point of a chord of a wafer to be moved are obtained by using an optical system fixedly arranged for chambers, and the position difference of the wafer to be moved from the wafer at the reference position is detected based on these data and the radius of the wafers, according to the present invention.

Additionally, an absolute value of the central coordinate of a wafer is not required to be obtained as is evident from the above described operations. That is, only the coordinate on the basis of the positions at which the optical sensors 6 and 7 are arranged is given, but the coordinate of the R-θ robot 1 is not given. Normally, the coordinates of sensor positions in a robot coordinate system must be accurately given in order to obtain the absolute coordinate of a wafer in the robot coordinate system. However, this procedure is troublesome, and will be a factor causing an error.

The capability of the wafer-moving device is intended to accurately move a wafer to a target position. It is not always necessary to obtain the absolute coordinate of the center of the wafer in order to implement this capability. That is, if the position difference of a wafer to be moved from the reference position of a wafer at the reference position in the hand 12 of the R-θ robot 1, that is the position of the wafer to be moved, which is relative to the wafer at the reference position, is obtained, the wafer to be moved can be accurately moved to a target position by arranging a mechanism for correcting the position difference in a similar manner as in the case where the wafer is held at the reference position.

Provided next is the explanation about the method for correcting wafer-moving operations performed by the R-θ robot 1 according to a detected position difference of a wafer by using the above described method. The teach coordinate of a target position of the wafer 2 is assumed to be (Rn, θn) below.

If the position of a wafer to be moved is different from that of a wafer at the reference position in the hand 12 of the R-θ robot 1, the teach coordinate must be corrected and the wafer is to be moved to a coordinate (Rn+Drn, θn−Dθn) in order to move the wafer to be moved to the target position. Since the position difference data (DX, DY) is represented in an X-Y coordinate system here, the amounts of corrections "Drn" and "Dθn" are obtained by the following expressions if the position difference data is converted into data in an R-θ coordinate system (robot coordinate system).

Dθn=tan$^{-1}$ (−Dx/Lr)

Drn=sin$^{-1}$ ((L1·sin (Rn)−Dy/2)/L1)−Rn

Here, "Lr", "L1", and "L2" indicate the following (refer to FIG. 2).

L1: the distance between the axes of arms 13 and 14

L2: the distance from the end of the arm 14 to the center of the wafer (the center of the reference position of the wafer)

Lr: the distance from the rotational axis 11 to the center of the wafer (the center of the reference position of the wafer)

$$Lr=2 \cdot L1 \cdot \sin (Rn)+L2$$

By making the above described corrections, the wafer to be moved can be accurately moved to a target position even if the position of the wafer to be moved is different from the reference position of the wafer on the R-θ robot 1.

That is, when the wafer 2 is moved from the chamber 3 to the chamber 4, the position difference of the wafer 2 when being taken out of the chamber 3 is detected, and the wafer 2 is accurately moved to a predetermined position within the chamber 4 while correcting the position difference. When the wafer 2 is moved from the chamber 4 to the chamber 3, the position difference of the wafer, which occurred during the process performed in the chamber 4 or during the handling operation after the process is detected, and the wafer 2 is smoothly inserted into a predetermined holding slot while correcting the position difference.

The above described embodiment assumes that an orientation flat is aligned beforehand. This assumption will not become a large obstacle in consideration of the actual process procedures of wafers.

Figure 7:
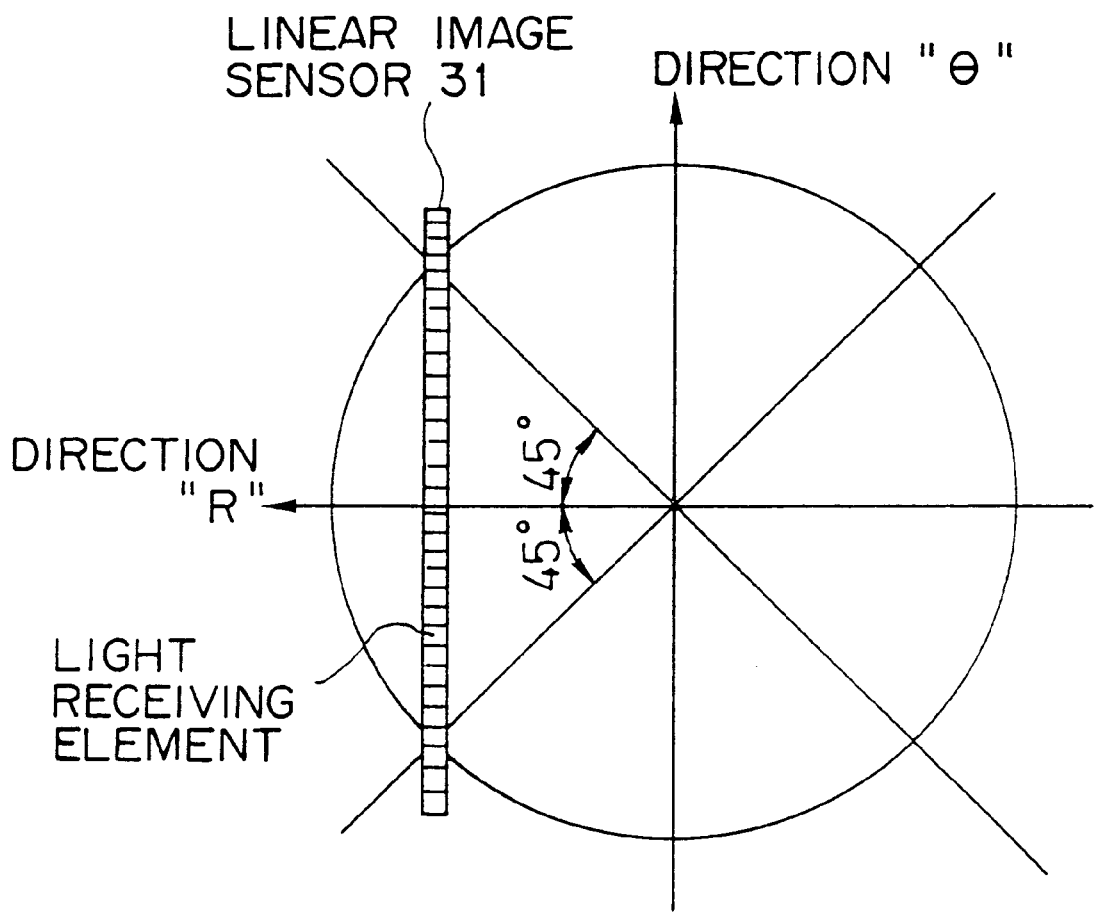
FIG. 7 is a schematic diagram showing the example in which a linear image sensor is used as a sensor for detecting an edge position of the wafer.

Furthermore, the above described embodiment adopts optical line sensors as the sensors for detecting edge positions of a wafer. However, an optical sensor in which many small light receiving elements are linearly arranged (for example, a linear image sensor) may be used. In this case, two linear image sensors may be arranged as the optical sensors 6 and 7 shown in FIG. 1 or 4. Or, one linear image sensor may be used to detect two edge positions of a wafer as shown in FIG. 7. In FIG. 7, each of light receiving elements structuring a linear image sensor 31 is represented by one square.

The linear image sensor 31 outputs a signal indicating whether or not each of the light receiving elements receives light (this operation is the same also when two linear image sensors are arranged). Here, the size of each of the light receiving elements and the interval between light receiving elements are very small. Accordingly, if the linear image sensor 31 is used, the edge positions of the wafer can be accurately detected as digital data.

Since the linear image sensor is used in a variety of fields such as a facsimile device field, existing products are easy to be utilized, which leads to a cheap implementation.

Figure 8:
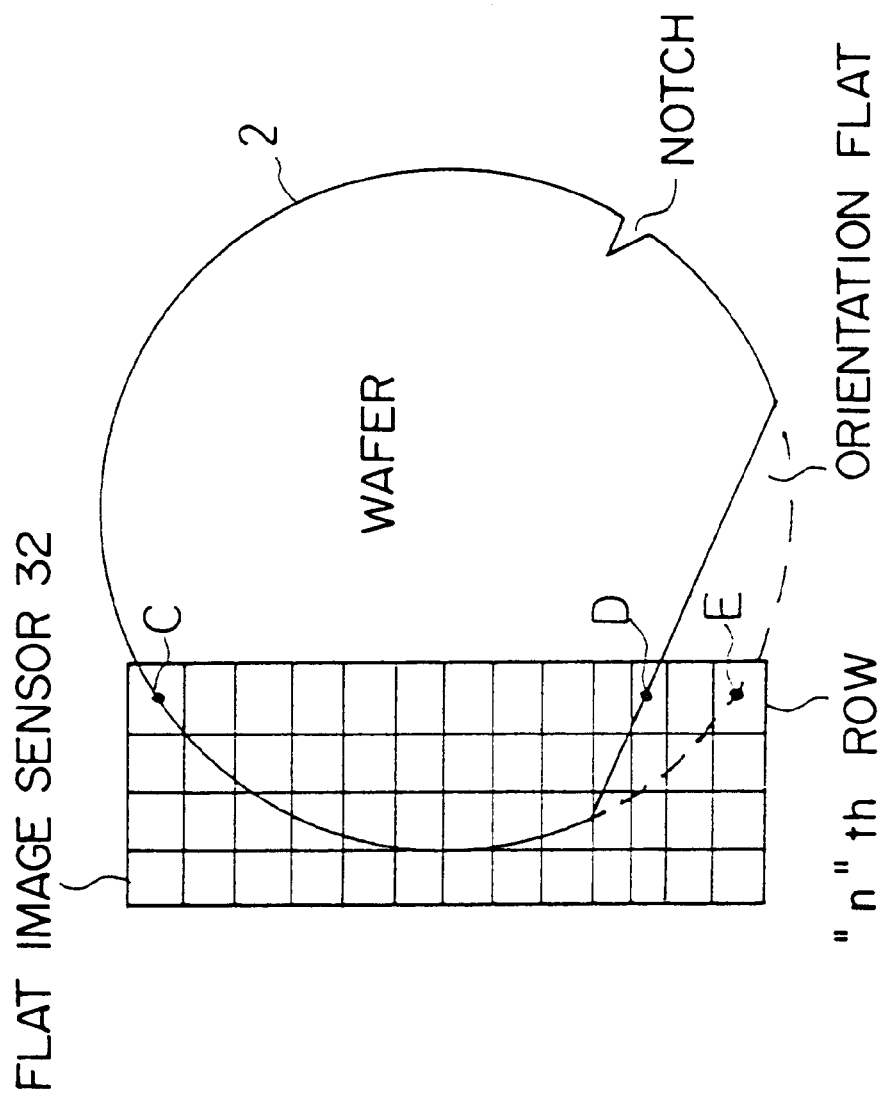
FIG. 8 is a schematic diagram showing the example in which a plane image sensor is used as the sensor for detecting an edge position of the wafer.

Furthermore, a plane (two-dimensional) image sensor may be used as the sensor for detecting edge positions of a wafer as shown in FIG. 8. In this figure, each of light receiving elements structuring a plane image sensor 32 is represented by one square.

By using a plane image sensor, a pattern of the shape of an edge of a wafer can be recognized. Therefore, the position of a wafer can be accurately detected even if its orientation flat is not aligned and stays in a portion to be measured as shown in FIG. 8. Namely, with the configuration in which the chord of the wafer 2 is detected by using the outputs of the light receiving elements arranged in an "n"th row, the chord CD is obtained as the actual outputs of the light receiving elements. However, the chord CE can be obtained by correcting the pattern and estimating the edge positions which should be obtained if the orientation flat is aligned. With a plane image sensor, not only an orientation flat of a wafer but also a notch, etc. can be detected, and a position difference can be accurately detected by eliminating its influence.

Figure 9:
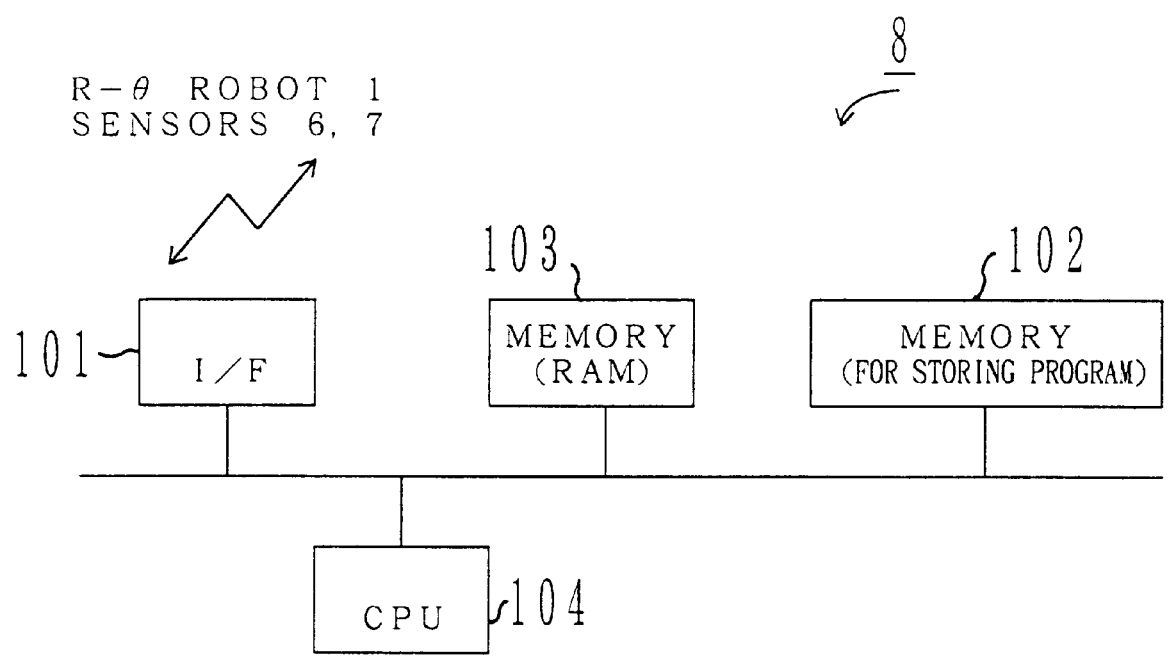
FIG. 9 is a block diagram showing the configuration of a robot controller.

FIG. 9 is a block diagram showing the structure of the robot controller 8. The robot controller 8 comprises an interface 101, memories 102 and 103, and a CPU 104. The interface 101 has the capability for receiving output data of the sensors 6 and 7 and the R-θ robot 1. The interface 101 has the capability for outputting a signal for controlling the operations of the R-θ robot 1, which are calculated by the CPU 104. The memory 102 stores the above described program for calculating a position difference. The memory 103 is a RAM area used when the position difference is calculated. The CPU 104 executes the program stored in the memory 102, and calculates the amount of the position difference of a wafer based on the output data of the sensors 6 and 7 and the Rθ robot 1. The CPU 104 generates a signal for controlling the state of the arms of the R-θ robot 1 based on the amount of the position difference.

According to this embodiment, the optical sensors 6 and 7 are arranged only in the direction of the chamber 3. However, a similar optical system and sensors or the like may be arranged for each chamber. With such a configuration, the position difference of a wafer can be detected only by stopping the wafer at a target chamber when moving the wafer to a chamber, thereby improving the wafer-moving speed in terms of the overall system.

The above described embodiment is explained based on the assumption that the diameter of a semiconductor wafer is known. However, the diameter of each semiconductor wafer may be measured beforehand by using an existing technique, and be input to the robot controller 8 so that it can be used for detecting the position difference of the semiconductor wafer. In this way, the position difference can be detected more accurately.

Note that the present invention is not limited to the device and method for detecting a position difference of a semiconductor wafer, but can be applied to various devices and methods for detecting a position difference of a discoid object.

As described above, edge positions of a wafer are measured in a stationary state and the position of the wafer is corrected by using the data, thereby easily and accurately correcting the position difference. Furthermore, since the position of a wafer is not detected while the wafer is being moved, the moving speed is not required to be slowed down, so that the wafer can be accurately moved and placed while maintaining the throughput of a system.

What is claimed is:

1. A device for detecting the position of a wafer relative to a reference position, comprising:

detecting means located at a predetermined position for obtaining by an optical measurement the position of the middle point and the length of a chord of a wafer disposed in a stationary position relative to the detecting means;

storing means for storing output data from said detecting means when a wafer disposed in said stationary position is also in said reference position; and calculating means for calculating the deviation of a wafer from said reference position based on comparison of the output data from said detecting means when the wafer is disposed in said stationary position with said output data stored in said storing means.

2. The device for detecting the position of a wafer according to claim 1, wherein said detecting means includes:

an optical system for generating a beam of light in a direction substantially perpendicular to a surface of a wafer; and light receiving means for receiving the beam of light, and said detecting means detects two edge positions of the wafer based on the output of said light receiving means, and obtains said position of the middle point and length of a chord by recognizing a segment connecting the two edge positions as the chord of the wafer.

3. The device for detecting the position of a wafer according to claim 2, wherein said light receiving means is an image sensor in which a plurality of light receiving elements are arranged.

4. The device for detecting the position of a wafer according to claim 2, wherein said light receiving means comprises two line sensors, and each of said line sensors detects an edge of the wafer.

5. A device for detecting the position of a wafer according to claim 1, wherein said calculating means determines the distance of the center of the wafer from said chord of the wafer by evaluating the equation: $Y=\sqrt{(r^2-(L/2)^2)}$ for the data stored in said storing means to determine Yo, and for the data when the wafer is in said stationary position to determine Ym, where r is the radius of said wafers, L is the length of the chord of the respective wafer, Yo−Ym is the deviation of the center of the wafer from the reference position along an axis perpendicular to the chord, and the deviation of the center of the wafer from the reference position along an axis parallel to the chord is determined from the difference between the positions of the middle points of the respective chords.

6. A device for detecting the position of a discoid object relative to a reference position, comprising:

detecting means, which includes an optical system for generating a beam of light in a direction substantially perpendicular to a surface of the discoid object and a light receiving unit for receiving the beam of light generated by said optical system, for detecting two edge positions of the discoid object while the discoid object is disposed in a stationary position relative to the detecting means; and calculating means for calculating a second position relative to a first position based on: a) output data from said detecting means when the discoid object occupies the first position; b) output data from said detecting means when the discoid object occupies the second position; and c) the radius of the discoid object.

7. A device, which is used together with a robot for moving a wafer to a predetermined position, for correcting a position deviation of the wafer on the robot, comprising:

detecting means located at a predetermined position for detecting two edge positions of a wafer when held by the robot by optical measurement in a predetermined direction relative to said predetermined position when the robot is in a predetermined stationary state;

calculating means for calculating a second position data relative to a first position based on: a) output data from said detecting means when the wafer occupies the first position; b) output data from said detecting means when the wafer occupies the second position; and c) the radius of the wafer; and correcting means for correcting operation of the robot based on said second position data calculated by said calculating means.

8. A device according to claim 7, wherein said calculating means determines from said two edge positions the length L of the chord joining said two edge positions, and determines the distance of the center of the wafer from the chord of the wafer by evaluating the equation: $Y=\sqrt{(r^2-(L/2)^2)}$ for the data when the wafer occupies said first position to determine Yo, and for the data when the wafer occupies said second position to determine Ym, where r is the radius of said wafers, Yo−Ym is the deviation of the center of the wafer from the reference position along an axis perpendicular to the chord, and the deviation of the center of the wafer from the reference position along an axis parallel to the chord is determined from the difference between the positions of the middle points of the respective chords.

9. A device according to claim 8, wherein said robot has an arm having an adjustable extension which is mounted for rotation about a pivot at one end and is provided at its other end with a hand for gripping a wafer, and said correcting means alters the extension of the robot arm and its angle of rotation about said pivot to compensate for said deviations.

\* \* \* \* \*